(12) United States Patent
Jung

(10) Patent No.: US 10,819,208 B2
(45) Date of Patent: Oct. 27, 2020

(54) VOICE COIL MOTOR

(71) Applicant: LG INNOTEK CO., LTD., Seoul (KR)

(72) Inventor: Tae Jin Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/783,664

(22) Filed: Feb. 6, 2020

(65) Prior Publication Data

US 2020/0177068 A1  Jun. 4, 2020

Related U.S. Application Data

(63) Continuation of application No. 16/269,782, filed on Feb. 7, 2019, now Pat. No. 10,587,179, which is a
(Continued)

(30) Foreign Application Priority Data

Sep. 3, 2012  (KR) ........................ 10-2012-0097323

(51) Int. Cl.
    *G02B 7/08*      (2006.01)
    *H02K 41/035*      (2006.01)
    *G03B 3/10*      (2006.01)

(52) U.S. Cl.
    CPC ........... *H02K 41/0356* (2013.01); *G02B 7/08* (2013.01); *G03B 3/10* (2013.01); *G03B 2205/0069* (2013.01)

(58) Field of Classification Search
    CPC ......... H02K 41/0356; G02B 7/08; G03B 3/10
(Continued)

(56) References Cited

U.S. PATENT DOCUMENTS 8,638,510 B2  1/2014  Lee
8,836,177 B2  9/2014  Lee
(Continued)

FOREIGN PATENT DOCUMENTS

CN      102263472      11/2011
JP      2008-281820      11/2008
(Continued)

OTHER PUBLICATIONS

International Search Report dated Sep. 2, 2013 issued in Application PCT/KR2013/005624.
(Continued)

*Primary Examiner* — Terrance L Kenerly
(74) *Attorney, Agent, or Firm* — KED & Associates LLP

(57) ABSTRACT

The VCM according to an exemplary embodiment of the present disclosure includes a base unit, a mover including a bobbin arranged at an upper surface of the base unit and formed with a plurality of rotation prevention units along a periphery and a first driving unit arranged at a periphery of the bobbin, a stator including a yoke configured to the base unit to surround the mover and inner yoke units each extended to between the rotation prevention units, and a second driving unit oppositely arranged to the first driving unit, and an elastic member elastically supporting the mover, wherein an object occurrence preventing portion is formed between the rotation prevention unit and the inner yoke units to decrease a contact area between the rotation prevention unit and the inner yoke units.

19 Claims, 3 Drawing Sheets

Related U.S. Application Data continuation of application No. 15/784,365, filed on Oct. 16, 2017, now Pat. No. 10,263,502, which is a continuation of application No. 14/419,780, filed as application No. PCT/KR2013/005624 on Jun. 26, 2013, now Pat. No. 9,819,254.

(58) Field of Classification Search
USPC ...................................................... 310/12.16
See application file for complete search history.

(56) References Cited

U.S. PATENT DOCUMENTS

| | | |
|---|---|---|
| 9,140,884 B2 | 9/2015 | Lee |
| 9,921,387 B2 | 3/2018 | Kim |
| 2011/0291495 A1 | 12/2011 | Lee et al. |
| 2012/0008220 A1 | 1/2012 | Lee |
| 2012/0008221 A1 | 1/2012 | Min |
| 2012/0146432 A1 | 6/2012 | Kim |
| 2013/0050828 A1 | 2/2013 | Sato |
| 2014/0092494 A1 | 4/2014 | Min |
| 2015/0061415 A1 | 3/2015 | Kim |
| 2015/0154205 A1 | 6/2015 | Min |

FOREIGN PATENT DOCUMENTS

| | | |
|---|---|---|
| KR | 10-2011-0058582 | 6/2011 |
| KR | 10-2011-0111624 | 10/2011 |
| KR | 10-2011-0131791 | 12/2011 |
| KR | 10-2012-0065492 | 6/2012 |
| KR | 10-2012-0065493 | 6/2012 |
| KR | 2012-0082197 | 7/2012 |
| WO | WO 2010/095853 | 8/2010 |

OTHER PUBLICATIONS

European Search Report dated May 3, 2016 issued in Application No. 13833363.8.

U.S. Office Action dated Feb. 24, 2017 issued in great-grandparent U.S. Appl. No. 14/419,780.

U.S. Notice of Allowance dated Jul. 14, 2017 issued in great-grandparent U.S. Appl. No. 14/419,780.

U.S. Office Action dated Jun. 14, 2018 issued in grandparent U.S. Appl. No. 15/784,365.

Korean Office Action dated Oct. 25, 2018 issued in Application 10-2012-0097323.

Chinese Office Action dated Jan. 29, 2019 issued in Application 201710978196.5 (full Chinese text).

U.S. Notice of Allowance dated Oct. 31, 2019 issued in parent U.S. Appl. No. 16/269,782.

VOICE COIL MOTOR

CROSS-REFERENCE TO RELATED APPLICATIONS

This application is a Continuation Application of U.S. patent application Ser. No. 16/269,782, filed Feb. 7, 2019, which is a Continuation Application of U.S. patent application Ser. No. 15/784,365 filed Oct. 16, 2017 (now U.S. Pat. No. 10,263,502), which is a Continuation Application of U.S. patent application Ser. No. 14/419,780, filed on Feb. 5, 2015 (now U.S. Pat. No. 9,819,254), which is a U.S. National Stage Application under 35 U.S.C. § 371 of PCT Application No. PCT/KR2013/005624, filed Jun. 26, 2013, which claims priority to Korean Patent Application No. 10-2012-0097323, filed Sep. 3, 2012.

TECHNICAL FIELD

The teachings in accordance with exemplary and non-limiting embodiments of this disclosure relate generally to a VCM.

BACKGROUND ART

Recently, mobile communication devices such as mobile phones, game machines and tablet PCs are mounted with camera modules including image sensors capable of storing an object in a digital still image or a video image.

A conventional camera module suffers from disadvantages in that that it is difficult to adjust a gap between an image sensor and a lens arranged at a front surface of the image sensor, and it is also difficult to accurately adjust a focus on an object, resulting in an image quality degradation of the digital image or video.

Concomitant with a recent development of a VCM (Voice Coil Motor), a gap between a lens and an image sensor can be adjusted to obtain an excellent digital image or a video. In order to drive a VCM, the VCM includes a stator including a magnet an a yoke, a rotor including a coil block arranged inside the stator and arranged at a periphery of a bobbin mounted with a lens to generate an electromagnetic force in response to a driving current applied from an outside, and a cover arranged at the stator to cover the rotor.

The conventional VCM however suffers from disadvantages in that, although a portion of a bobbin is hitched at a yoke to prevent the bobbin from rotating abnormally, the bobbin contacted to the yoke allows the bobbin to generate particles such as fine dust or fine objects, and the fine objects are in turn collected at an IR (Infrared) filter arranged at a bottom surface of the bobbin to deteriorate a display quality of an image or a video.

The present disclosure is to provide a VCM configured to decrease or inhibit generation of objects from a bobbin in a case a yoke and the bobbin are contacted, whereby a display quality degradation of an image or a video can be prevented.

Technical problems to be solved by the present disclosure are not restricted to the above-mentioned descriptions, and any other technical problems not mentioned so far will be clearly appreciated from the following description by skilled in the art.

In one exemplary embodiment of the present disclosure, there is provided a VCM, the VCM comprising:

a base unit, a mover including a bobbin arranged at an upper surface of the base unit and formed with a plurality of rotation prevention units along a periphery and a first driving unit arranged at a periphery of the bobbin, a stator including a yoke configured to the base unit to surround the mover and inner yoke units each extended to between the rotation prevention units, and a second driving unit oppositely arranged to the first driving unit, and an elastic member elastically supporting the mover, wherein an object occurrence preventing portion is formed between the rotation prevention unit and the inner yoke units to decrease a contact area between the rotation prevention unit and the inner yoke units.

A VCM according to an exemplary embodiment of the present disclosure has an advantageous effect in that a contact area between a rotation prevention unit of a bobbin and an inner yoke unit of a yoke contacting the rotation prevention unit of the bobbin is reduced to decrease or inhibit generation of objects generated from the rotation prevention unit when the rotation prevention unit of the bobbin and the inner yoke unit are brought into contact, whereby quality degradation of an image or a video can be prevented.

DETAILED DESCRIPTION

The disclosed exemplary embodiments and advantages thereof are best understood by referring to the accompanying drawings. Like numbers refer to like elements throughout. In the figures, certain layers, sizes, shapes, components or features may be exaggerated for clarity and convenience.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 1:
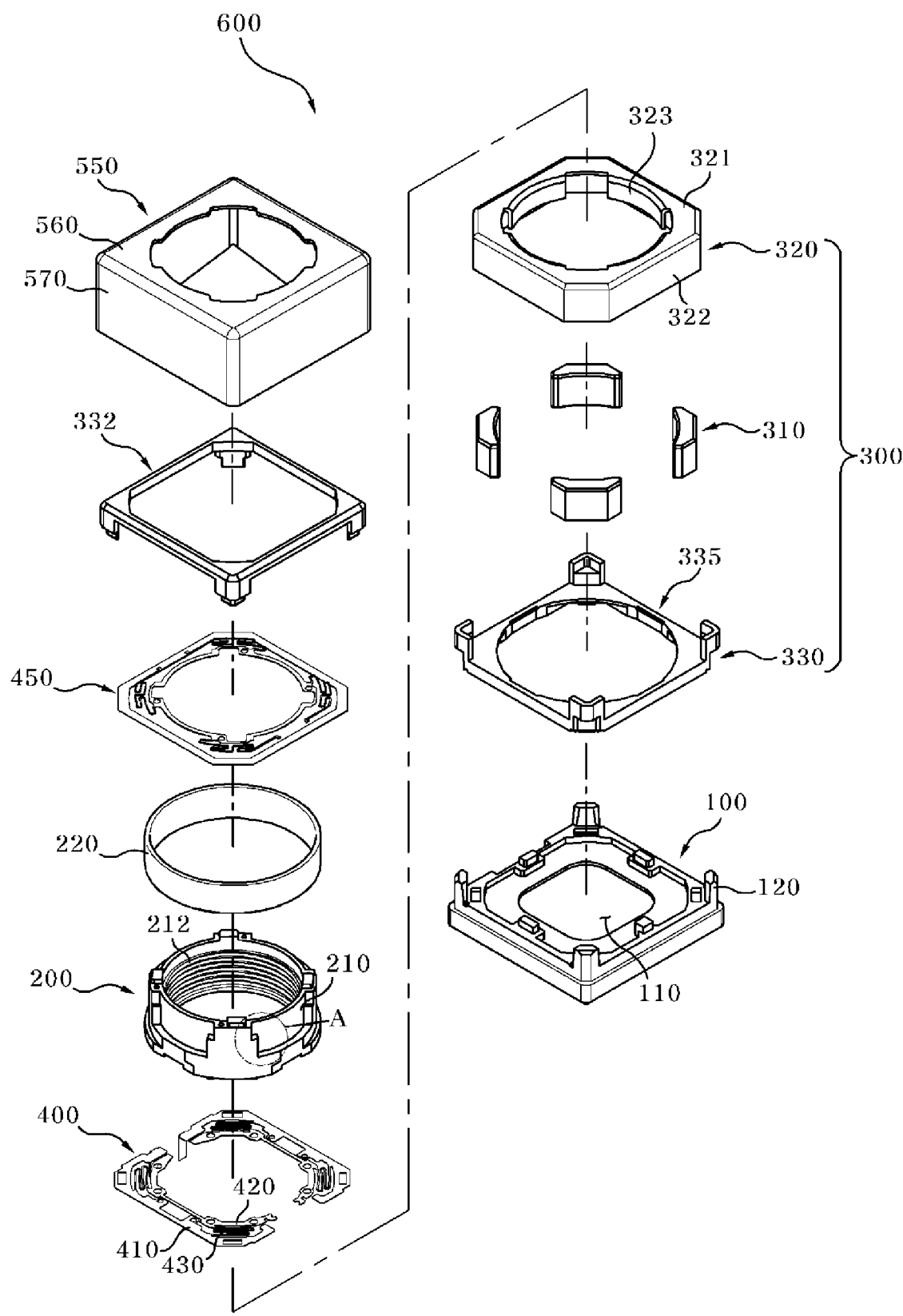
FIG. 1 is a cross-sectional view illustrating a VCM according to an exemplary embodiment of the present disclosure.
Figure 2:
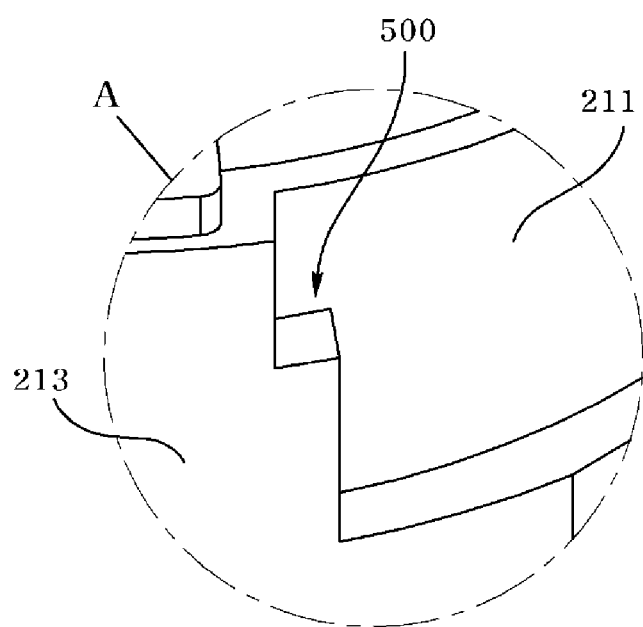
FIG. 2 is an enlarged view of 'A' of FIG. 1.
Figure 3:
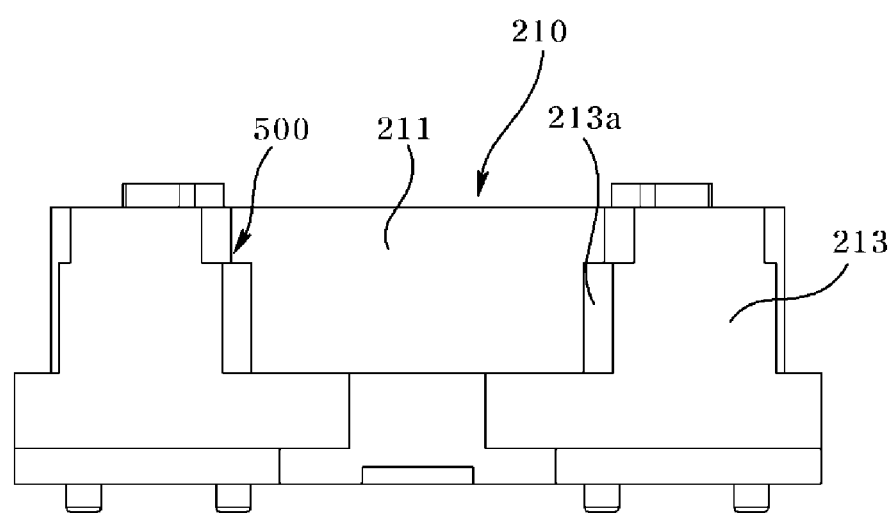
FIG. 3 is a lateral view of a bobbin of FIG. 1.

FIG. 1 is a cross-sectional view illustrating a VCM according to an exemplary embodiment of the present disclosure, FIG. 2 is an enlarged view of 'A' of FIG. 1, and FIG. 3 is a lateral view of a bobbin of FIG. 1.

Referring to FIGS. 1, 2 and 3, a VCM (600) includes a base unit (100), a mover (200), a stator (300), an elastic member (400) and an object occurrence preventing portion (500).

The base unit (100) takes a shape of a cubic plate, and is centrally formed with a through hole (110) passing through an upper surface of the base unit (100) and a bottom surface opposite to the upper surface. Each of four corners formed on the upper surface of the base unit (100) is coupled to a coupling pillar (120), where the coupling pillar (120) is coupled to a spacer (330, described later). The mover (200) includes a bobbin (210) and a first driving unit (220).

The bobbin (210) takes a shape of a cylinder opened at an upper surface and a bottom surface, and may be formed at an inner surface with a female screw unit (212) for mounting at least one cylindrical lens. The bobbin (210) is protrusively formed at a periphery (211) with a plurality of rotation prevention units (213) along the periphery (211) of the bobbin (210), where four rotation prevention units (213) may be formed along the periphery (211) of the bobbin (210), each spaced apart at a predetermined distance.

The rotation prevention units (213) prevent the rotation of the bobbin (210) by being hitched by an inner yoke portion (323) of a yoke (320, described later).

Although the exemplary embodiment of the present disclosure has described a plurality of rotation prevention units (213) protruded from the periphery (211) of the bobbin (210) each spaced apart at a predetermined distance, alternatively, it should be apparent that each of the rotation prevention units (213) formed on the bobbin 210) may take a recess shape concaved from the periphery (211) of the bobbin (210).

The first driving unit (220) is formed by winding a long wire insulated by an insulating resin, and may be bonded to a surface of the rotation prevention unit (213) of the bobbin (210) using an adhesive. The stator (300) includes a second driving unit (310) and a yoke (320). In addition, the stator (300) may include a spacer (330).

In the exemplary embodiment of the present disclosure, the second driving unit (310) is arranged at an outside of the first driving unit (220). The second driving unit (310) is arranged opposite to the first driving unit (220). The second driving unit (310) includes four magnets in a shape of a pillar, for example, and the four pillar-like magnets are formed about the first driving unit (220), each spaced apart at a predetermined distance.

The yoke (320) is formed in a shape of a square plate, and includes a yoke upper plate (321) centrally formed with a round opening and yoke lateral plates (322) extended from four edges of the yoke upper plate (321) to wrap the mover (100). Each of inner corners formed by a pair of adjacent yoke lateral plates (322) is arranged with the second driving unit (310). The yoke upper plate (321) is formed with an inner yoke unit (323) extended from the opening of the yoke upper plate (321) to the rotation prevention units (213) of the bobbin (210).

The inner yoke unit (323) functions to prevent the bobbin (210) from rotating by being contacted to the rotation prevention unit (213) in a case the bobbin (210) is rotated by leakage of electromagnetic field generated by the first driving unit (220) and turning effect generated in a case a lens is mounted to the bobbin (210).

The elastic member (400) is arranged at a bottom surface of the bobbin (210) of the mover (200). In the exemplary embodiment of the present invention, the elastic member (400) may be formed in a pair, and each of the elastic members (400) is electrically insulated. The pair of elastic members (400) includes an inner elastic unit (410), an outer elastic unit (420) and a connection elastic unit (430).

The outer elastic unit (420), when seen in a top plan view, takes a shape of a bent strip, and is coupled to the coupling pillar (120) by being inserted into a pair of adjacent coupling pillars (120) of the base unit (100). The inner elastic unit (410) is arranged at a bottom surface of the bobbin (210). Thus, the inner elastic unit (410) takes a shape of a curved strip similar in shape to the bottom surface of the bobbin (210). The connection elastic unit (430), when seen in a top plan view, is formed in a zigzag shape to be connected to the inner and outer elastic units (410, 420).

Referring to FIG. 1 again, an upper surface opposite to the bottom surface of the bobbin (210) is arranged with an additional elastic member (450) elastically supporting the bobbin (210). The spacer (330) serves to fix the elastic member (400), the additional elastic member (450), the mover (200) and the stator (300). The spacer (330) includes an upper spacer (332) and a bottom spacer (335), where the upper and bottom spacers (332, 335) are meshed. The bottom spacer (335) is coupled to the coupling pillars (120) of the base unit (100). The outer elastic unit (420) of the elastic member (400) is fixed between the bottom spacer (335) and an upper surface of the base unit (100), and the additional elastic member (450) is fixed to a bottom surface of the upper spacer (332).

A cover (550) includes a cover upper plate (560) formed in a shape of a square plate having a round opening for exposing a lens and a cover lateral plate (570) extended from an edge of the cover upper plate (560). The cover lateral plate (570) is coupled to the base unit (100).

Referring to FIGS. 2 and 3, the bobbin (210) is applied with a turning effect in a case a lens is coupled to the bobbin (210), or the bobbin (210) vertically moves, and the bobbin (210) is horizontally rotated by the turning effect applied to the bobbin (210). At this time, in a case the bobbin (210) is rotated, the elastic member (400) and the additional elastic member (450) are deformed or twisted to twist an optical axis of the mover (200) or to generate a driving defect of the mover (200).

As noted from the foregoing, the rotation of bobbin (210) is prevented by the rotation prevention unit (213) formed at the periphery of the bobbin (210) and the inner yoke unit (323) of the yoke (320), where, in a case the inner yoke unit (323) and the rotation prevention unit (213) are brought into contact, a fine objects may be generated from the bobbin (210) which is a molded material, and the fine objects may drop to be introduced to an upper surface of an IR (Infrared) filter arranged at a rear surface of the base unit (100).

In a case the fine objects generated from the bobbin (210) are introduced to an upper surface of an IR (Infrared) filter, there may be generated a quality degradation of a digital image or a video due to the fine objects.

In the exemplary embodiment of the present disclosure, the VCM (600) includes the object occurrence preventing portions (500) preventing generation of objects by contact between the rotation prevention unit (213) of the bobbin (210) and the inner yoke unit (323) of the yoke (320). The object occurrence preventing portions (500) reduce or inhibit, for example, a generated amount of fine objects from the rotation prevention unit (213) by reducing a contact area between the rotation prevention unit (213) of the bobbin (210) and the inner yoke unit (3230 of the yoke (320). The object occurrence preventing portion (500) is formed at each lateral surface (213a) of the rotation prevention unit (213) opposite to both lateral surfaces of the inner yoke unit (323) and contacting the inner yoke unit (323).

Particularly, the object occurrence preventing portion (500) formed on the lateral surfaces (213a) opposite to both lateral surfaces of the inner yoke unit (323) is formed in a shape of a staircase extended outwardly from the rotation prevention unit (213) for reducing the generated amount of fine objects from the rotation prevention unit (213).

To be more specific, in a case the both lateral surfaces of the inner yoke unit (323) are formed in a shape of a straight line, a first gap is formed between the lateral surfaces of the rotation prevention unit (213) and the lateral surfaces of the inner yoke unit (323), and a second gap greater than the first gap is formed between the lateral surfaces of the object occurrence preventing portion (500) and the inner yoke unit (323).

Hence, in a case the bobbin (210) is rotated, the lateral surfaces of the inner yoke unit (323) are brought into contact with each lateral surface (213a) of the area-reduced rotation prevention unit (213), whereby the generated amount of objects can be reduced or inhibited by the rotation prevention unit (213). Furthermore, in view of the fact that the bobbin (210) is injection-molded, the object occurrence preventing portion (500) may be formed at a predetermined depth from an upper surface of the bobbin (210).

Meanwhile, in a case the object occurrence preventing portion (500) is formed using an injection molding method, albeit being difficult, the object occurrence preventing portion (500) may be intermittently formed with at least two rotation prevention units (213) in order to reduce a contact area between the rotation prevention unit (213) of the bobbin (210) and the inner yoke unit (323).

Figure 4:
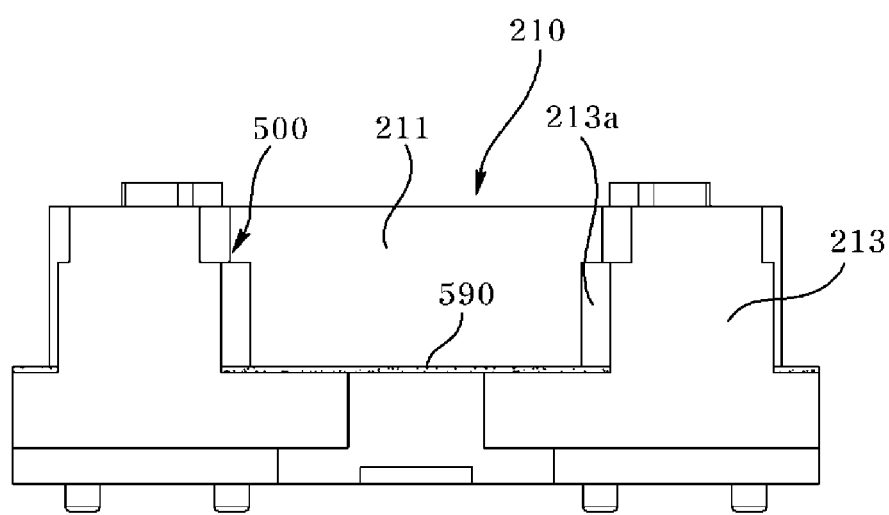
FIG. 4 is a perspective view illustrating a bobbin according to another exemplary embodiment of the present disclosure.

Now, referring to FIG. 4, even if the amount of objects generated by contact between the rotation prevention unit (213) and the inner yoke unit (323) in response to the rotation of bobbin (210) may be reduced or inhibited by the object occurrence preventing portion (500), a small amount of objects can be generated, such that, in the exemplary embodiment of the present disclosure, an object collecting member (590) may be formed at a floor surface of a groove formed by the rotation prevention unit (213) in order to prevent a small amount of objects generated from the rotation prevention unit (213) from entering the IR filter.

The object collecting member (590) may include a synthetic resin, for example, having a sufficient viscosity for collecting the foreign objects. The object collecting member (590) may include an epoxy resin having a viscosity.

Although the exemplary embodiment of the present disclosure has described and explained the reduction or inhibition of fine objects of the rotation prevention unit (213) of the bobbin (210) by forming a recess-shaped object occurrence preventing portion (500) on the rotation prevention unit (213) of the bobbin (210), alternatively, a portion of the inner yoke unit (323) of the yoke (320) opposite to the rotation prevention unit (213) may be cut to reduce a contact area with the rotation prevention unit (213). Furthermore, in a case an object occurrence preventing portion is formed at a lateral surface of the inner yoke unit (323), a plurality of object occurrence preventing portions may be intermittently formed along the lateral surface of the inner yoke unit (323).

As apparent from the foregoing, a contact area between a rotation prevention unit of a bobbin and an inner yoke unit of a yoke contacting the rotation prevention unit of the bobbin is reduced to decrease or inhibit generation of objects generated from the rotation prevention unit when the rotation prevention unit of the bobbin and the inner yoke unit are brought into contact, whereby quality degradation of an image or a video can be prevented.

The previous description of the present disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to limit the examples described herein, but is to be accorded the widest scope consistent with the principles and novel features disclosed herein.

What is claimed is:

1. A voice coil motor, comprising:
    a base unit;
    a bobbin comprising a first outer peripheral surface and a plurality of rotation prevention units formed on the first outer peripheral surface;
    a coil disposed on the bobbin;
    a yoke comprising an upper plate, a lateral plate extending from an outer edge of the upper plate and an inner yoke extending from an inner edge of the upper plate;
    a magnet disposed between the coil and the lateral plate of the yoke and facing the coil; and
    an upper elastic member coupled to an upper surface of the bobbin,
    wherein the plurality of rotation prevention units comprises a second outer peripheral surface outwardly protruding than the first outer peripheral surface of the bobbin,
    wherein the coil is disposed on the second outer peripheral surface of the plurality of rotation prevention units,
    wherein at least a portion of the inner yoke is disposed between the coil and the first outer peripheral surface of the bobbin and between the plurality of rotation prevention units, and
    wherein at least one of the plurality of rotation prevention units comprises a first portion forming an edge of the at least one of the plurality of rotation prevention units and spaced apart from the upper surface of the bobbin.

2. The voice coil motor of claim 1, wherein an object occurrence preventing portion is formed between the first portion of the rotation prevention unit and the upper surface of the bobbin.

3. The voice coil motor of claim 1, wherein the first outer peripheral surface of the bobbin directly connects an upper surface of the first portion and the upper surface of the bobbin in an optical axis direction.

4. The voice coil motor of claim 1, wherein the at least one the plurality of rotation prevention units comprises a second portion directly connected with the upper surface of the bobbin,
    wherein the first portion is disposed on both sides of the second portion.

5. The voice coil motor of claim 1, wherein the at least a portion of the inner yoke is disposed between the plurality of rotation prevention units to be hitched by the rotation prevention unit to prevent rotation of the bobbin.

6. The voice coil motor of claim 1, wherein the coil is disposed on the second outer peripheral surface of the plurality of rotation prevention units so that a space is formed between the coil and the first outer peripheral surface of the bobbin, and
    wherein at least a portion of the inner yoke is disposed in the space between the coil and the first outer peripheral surface of the bobbin.

7. The voice coil motor of claim 1, wherein the upper elastic member comprises an inner part disposed on the upper surface of the bobbin, an outer part disposed outside the inner part and a connection part connecting the inner part and the outer part, and
    wherein the first portion of the rotation prevention unit is spaced apart from the upper elastic member.

8. The voice coil motor of claim 1, wherein a recess is recessed from the upper surface of the bobbin to decrease a contact area between the rotation prevention unit of the bobbin and the inner yoke.

9. The voice coil motor of claim 8, wherein the inner yoke contacts the rotation prevention unit when the bobbin is rotated.

10. The voice coil motor of claim 8, wherein the upper elastic member is not overlapped with the recess in an optical axis direction.

11. The voice coil motor of claim 1, wherein the inner yoke comprises a lateral surface facing a lateral surface of the rotation prevention unit, wherein a recess is formed in a shape of a staircase having a first depth from the upper surface of the bobbin and a second depth from the lateral surface of the rotation prevention unit, wherein a first gap is formed between the lateral surface of the rotation prevention unit and the lateral surface of the inner yoke, and a second gap is formed between a lateral surface of the recess and the lateral surface of the inner yoke, and wherein the second gap is greater than the first gap.

12. The voice coil motor of claim 11, wherein an object collecting member is disposed between the plurality of rotation prevention units, and wherein the object collecting member comprises an epoxy resin having a viscosity.

13. The voice coil motor of claim 1, wherein the plurality of rotation prevention units are integrally formed with bobbin as one body.

14. A camera module, comprising
the voice coil motor of claim 1;
a lens coupled to the bobbin of the voice coil motor; and
an image sensor.

15. A mobile phone comprising the camera module of claim 14.

16. A voice coil motor, comprising:
a base unit;
a bobbin comprising a first outer peripheral surface and a rotation prevention unit formed on the first outer peripheral surface;
a coil disposed on the bobbin;
a yoke comprising an upper plate, a lateral plate extending from an outer edge of the upper plate and a plurality of inner yokes extending from an inner edge of the upper plate;

a magnet disposed between the coil and the lateral plate of the yoke and facing the coil; and
an upper elastic member coupled to an upper surface of the bobbin, wherein the rotation prevention unit comprises a second outer peripheral surface outwardly protruding than the first outer peripheral surface of the bobbin, wherein the coil is disposed on the second outer peripheral surface of the rotation prevention unit, wherein at least a portion of the plurality of inner yokes is disposed between the coil and the first outer peripheral surface of the bobbin, wherein the rotation prevention unit of the bobbin is disposed between the plurality of inner yokes, and wherein the rotation prevention unit comprises a first portion forming an edge of the rotation prevention unit and spaced apart from the upper surface of the bobbin.

17. The voice coil motor of claim 16, wherein an object occurrence preventing portion is formed between the first portion of the rotation prevention unit and the upper surface of the bobbin.

18. The voice coil motor of claim 16, wherein the first outer peripheral surface of the bobbin directly connects an upper surface of the first portion and the upper surface of the bobbin in an optical axis direction.

19. The voice coil motor of claim 16, wherein the rotation prevention unit of the bobbin is formed as a plurality of rotation prevention units, and wherein the plurality of rotation prevention units are disposed between the plurality of inner yokes.

* * * * *